Jan. 18, 1938.  J. M. PESTARINI  2,106,014
ELECTRIC CURRENT CONVERTER
Filed Jan. 11, 1937  5 Sheets-Sheet 1

Inventor,
Joseph Maximny Pestarini

Jan. 18, 1938.  J. M. PESTARINI  2,106,014
ELECTRIC CURRENT CONVERTER
Filed Jan. 11, 1937    5 Sheets-Sheet 2

Inventor;
Joseph Maximus Pestarini

Jan. 18, 1938.   J. M. PESTARINI   2,106,014
ELECTRIC CURRENT CONVERTER
Filed Jan. 11, 1937   5 Sheets-Sheet 5

Inventor,
Joseph Maximus Pestarini

Patented Jan. 18, 1938

2,106,014

UNITED STATES PATENT OFFICE 2,106,014

ELECTRIC CURRENT CONVERTER

Joseph Maximus Pestarini, Grant City, Staten Island, N. Y.

Application January 11, 1937, Serial No. 120,059
In France January 11, 1936

4 Claims. (Cl. 175—363)

This invention relates to a mercury vapour-filled discharge device for converting electric current, more particularly of the type provided with a control grid for the anodic current.

It is known that by the use of these grids the anodic current may be regulated, but with the grid-controlled arrangements devised heretofore it is not possible to obtain automatically any predetermined current-voltage characteristic in the mercury vapour-filled converter.

An object of this invention is to obtain and maintain automatically and with great accuracy a current-voltage characteristic of any desired form even with sharp variations in the operating conditions. According to the present invention the grids are controlled by a voltage generated by a special electric device comprising an induction regulator and a metadyne.

The metadyne is a rotating direct current electric machine described in a number of applicant's prior patents. It comprises a rotor connected to a commutator and a stator completing the magnetic circuit of the rotor. Two pairs of brushes are arranged on the commutator, the brushes of the first pair, called primary brushes, are generally maintained at a constant potential difference, while the other brushes, called secondary brushes, generally have a potential difference varying in a continuous manner. The current flowing through the primary brushes, called "primary current", generates by its ampere turns on the rotor the flux which induces an electromotive force between the secondary brushes, the potential difference whereof is called secondary voltage; conversely, the current flowing through the secondary brushes called "secondary current" generates by its ampere turns on the rotor a flux which sets up an electromotive force between the primary brushes, the potential difference whereof is called "primary voltage".

The stator may be deprived of or provided with windings of which the ampere turns are added up to the ampere turns on the rotor thereby affecting the operation of the metadyne.

The metadyne comprises a "secondary variator winding", this being a stator winding of which the magnetic axis is directed so that the flux generated by the ampere turns of said winding induces an electromotive force across the primary brushes.

For simplicity's sake I will describe hereinafter only the elements of the metadyne which are essential for the full comprehension of this invention, but it will be obvious that the metadyne used in carrying out the invention may comprise all the improvements not specifically referred to herein and set forth in my prior patents.

The combination according to this application consists essentially in that the secondary brushes of a metadyne that shall be referred to hereafter as "control metadyne" are connected to the cathode and to the neutral point of the phases of the induction regulator, respectively, the ends of said phases being connected to the grids, of which the potential is thus brought with respect to the cathode potential to a value which is the sum of the value of the A. C. voltage due to the corresponding phase of the induction regulator and the value of the D. C. secondary voltage of the metadyne. The windings of the secondary variator winding are arranged on the metadyne stator and their magnetic axis has such a direction as to induce an electromotive force between the primary brushes generally, this variator winding is composed of three elements, a first element being shunt between the primary brushes and annulling alone the rotor ampere turns of the secondary current; a second element generating ampere turns proportional to the electric value to be regulated (for instance to the D. C. voltage or the direct current supplied by the converter) and a third element setting up ampere turns that may be either constant or variable according to an arbitrarily preestablished law.

The operation is as follows: When the ampere turns of the second element of the secondary variator are equal and of opposite direction the ampere turns of the third element, there obviously will be neither a primary nor a secondary current in the control metadyne and, consequently, no secondary voltage in the metadyne. As soon as a difference occurs between the ampere turns of the second and third element of the secondary variator, a primary current and a secondary current are produced in the metadyne as well as a secondary voltage modifying the value of the grid voltage and consequently varying the ignition timing of the corresponding anode. In this manner, regulation of the anode voltage is effected as a function of a small difference between the ampere turns of the second and third element of the secondary variator. The smaller this difference, the nearer the converter characteristic will come to the desired one; now, it is known that in a metadyne a very great variation in the primary current, and consequently in the secondary voltage, is obtained very rapidly even with a very slight variation in the ampere turns of the secondary variator, which is a prominent feature of the metadyne.

The accompanying drawings show by way of example some ways of carrying out this invention.

Figure 1:
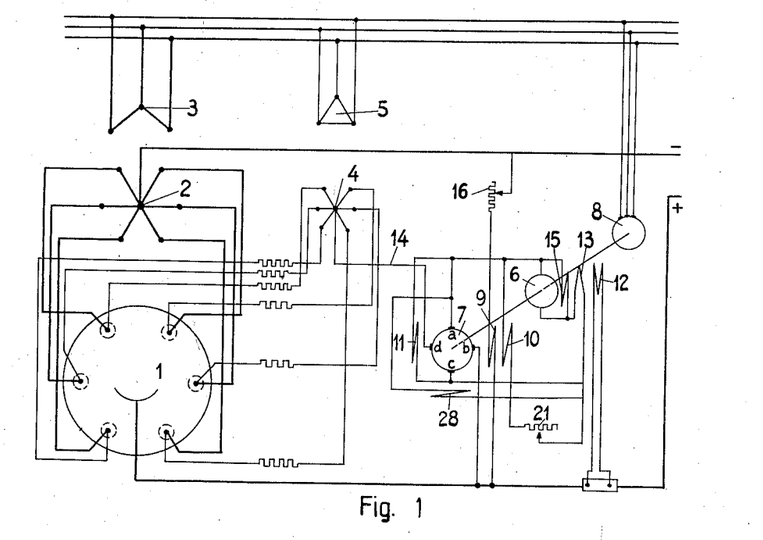
Figure 1 is a general diagram of the six phase-converter system.

Referring to Figure 1, the anodes of the converters 1 are connected to the ends of the six-phase star connection 2 of the secondary winding of a transformer, the primary winding whereof 3 is connected in the form of a three-phase star. The induction regulator comprises a primary winding 5 and its secondary six-phase star winding 4; the control metadyne indicated by 7 has its primary brushes $a$ and $c$ connected to a source of direct current, for instance a generator 6. The generator 6 and metadyne 7 are driven by a motor 8 connected to the alternating current network which is supposed to be of strictly constant frequency, affording a constant speed of the three machines 6, 7 and 8. The control metadyne 7 has one of its secondary brushes, namely the brush $b$, connected to the cathode of the converter, the other secondary brush $d$ being connected to the neutral point of the six-phase star 4 of the inductive regulator through the lead 14.

The control metadyne 7 has a secondary variator composed of three elements; the winding 11 which alone reduces the secondary current to zero, the winding 9 which sets up ampere turns proportional to the direct voltage supplied by the converter, and the winding 10 connected across the auxiliary source of current 6. The latter source is a shunt generator provided with two field windings, namely the series winding 13 and the winding 12 connected to the terminals of a shunt traversed by the direct current supplied by the converter. The shunt winding 15 tends to set up a constant electromotive force; the series winding 13 tends to compensate for the ohmic drop and the ampere winding 12 tends to vary the electromotive force set up in the desired manner as a function of the current supplied by the converter. The regulation of the ampere turns of the elements 9 and 10 is effected by means of the resistors 16 and 21.

The windings 15, 13 and 12 are so regulated as to induce at the brushes of the generator 6 a voltage proportional to the arbitrarily preestablished value of the D. C. voltage intended to be supplied by the converter set. The ampere turns of the third element 10 of the variator winding shall therefore be proportional to the desired voltage value as a function of the main current supplied. The ampere turns of the second element 9 of the variator are at any time proportional to the direct voltage supplied by the converter. If the antagonistic ampere turns of said two elements compensate one another there will be no primary current in the metadyne and, consequently, no secondary voltage, which means that the potential of the neutral point of the star 4 becomes the same as that of the cathode. A very slight difference between the ampere turns of the elements 15 and 10 will result in a secondary voltage of an appreciable value being set up in the metadyne, which modifies in the desired manner the potential of the neutral point of the star 4 and consequently modifies in the desired sense the timing of the anodes and the direct voltage supplied by the converter.

The power dissipated by the elements 9, 10 and 11 of the secondary variator of the metadyne is of the order of some watts, therefore, it is easily possible to render the ratio between the ampere turns set up by these elements and the voltages feeding them independent of temperature, for instance by connecting in series with said elements strong resistances made of known alloys having a temperature coefficient which is very nearly zero. The same applies to the shunt winding 15.

The current from the neutral of the star 4 is the current from the grids; therefore, it is not zero, but has a mean value which, though being very small, is above zero and chiefly depends on the value of the resistances connected between the grids and the ends of the star 4. To make up for this mean value of the secondary current of the control metadyne, it is sufficient to slightly modify the ampere turns of the first element 11 of the metadyne variator.

It is often useful to generate a compensating electromotive force between the neutral point of the star 4 and the cathode to allow for the voltage drop in the arc in the converter and the "ionic ignition delay". In order to generate in the metadyne this secondary compensating electromotive force, it will be sufficient to provide a primary variator winding 28 on the stator of the metadyne, having its magnetic axis directed to generate a flux which sets up an electromotive force across the secondary brushes having the desired value and sense.

For sake of simplicity in the figures which shall be hereinafter described the primary winding 28 has not been shown, being understood that such a winding may be provided.

By suppressing the winding 12 it is possible to obtain a strictly constant direct voltage. It will obviously be possible to adopt instead of the induction regulator shown in Figure 1, any other source of polyphase electromotive forces of suitable form and phase displacement in star formation.

I will now describe modifications of this basic arrangement. To simplify the drawing, the part of Figure 1 on the left of the lead 14 comprising the converter, transformer and induction regulator has not been shown hereinafter.

Figure 2:
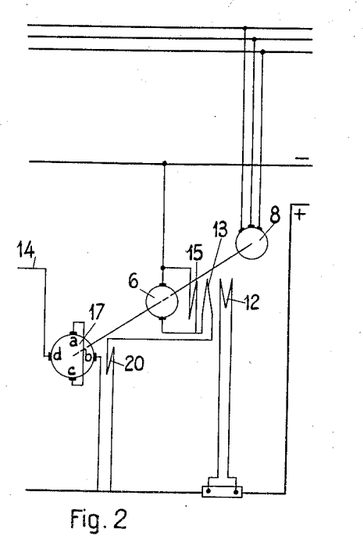
Figures 2 and 3 show two modifications of the connections of the control metadyne concerning the regulation of the direct voltage supplied by the converter.

Figure 2 shows a modification of the arrangement shown in Figure 1; the control metadyne has its primary brushes maintained at a substantially constant potential difference which may be of any value, for instance zero; in the latter case it will be sufficient to short circuit the primary brushes. The metadyne 17 shown in Fig. 2 is then obtained, the first element of the secondary variator being in this case dispensed with. In this figure the auxiliary source of current 6, instead of being absolutely independent of the direct current network as in Fig. 1, is connected in opposition to the electromotive force of said network.

In this manner, however, instead of two elements, namely the second and third element of the secondary variator, it will be sufficient to have one element 20 only. When the voltage of the direct current network equals the electromotive force of the auxiliary source 6, no current flows through the element 20, and in the metadyne 17 there is neither a primary current nor a secondary voltage. Conversely, when the voltage of the direct current network deviates somewhat from the value of the electromotive force of the generator 6, an appreciable current flows through the secondary variator 20, a primary current flows through the metadyne and a secondary voltage is set up, which modifies the potential of the neutral point of the star 4 and consequently modifies ignition timing of the anodes in the desired sense. It is true that the diagram shown in Fig. 2 has one winding 20 only, instead of two opposite windings 9 and 10 as shown in Fig. 1, but it should be noted that opposition of the source 6 to the voltage of the continuous current network requires an accurate construction of the generator 6, while, with the arrangement shown in Fig. 1, the generator 6 is a low voltage, for instance a 100 volt generator.

Figure 3:
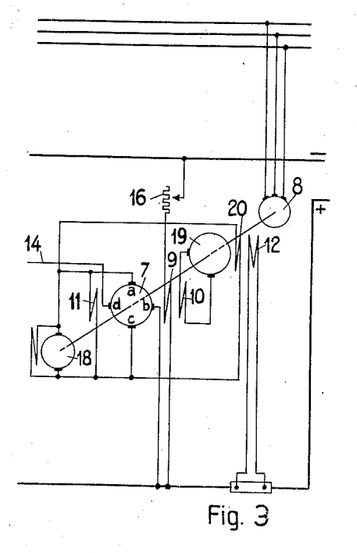

In Figure 3 the third element 10 of the secondary variator of the control metadyne 7 is fed by a special generator 19 capable of supplying a current-voltage characteristic of desired complex shape; this generator is called modulator and it shall be described hereinafter. The modulator 19 generally requires a plurality of exciter windings, of which a winding 20 should create a constant number of ampere turns; in Figure 3, 18 denotes an auxiliary shunt generator driven by the same motor 8 and supplying a direct current of constant voltage, said generator feeding the field winding 20 and the primary brushes $a$ and $c$ of the metadyne 7. To energize the modulator 19 a further winding is required through which a variable current flows which is proportional to the electric value constituting the independent variable of the desired characteristic. In the diagram of Figure 3, the intensity of the direct current network has been chosen as an independent variable and a current is caused to flow through the variable field winding 12 of the modulator which is derived from the shunt connected in the direct current network.

Figure 4:
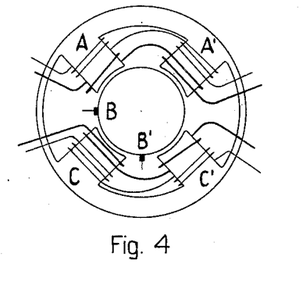
Figure 4 shows an auxiliary machine, called modulator, by which it is possible to obtain different characteristic forms.
Figure 5:
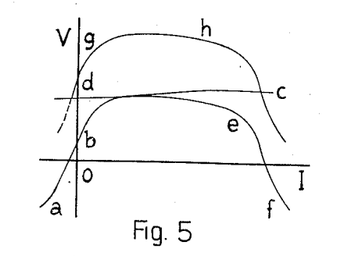
Figures 5, 7 and 8 show examples of such characteristics.

Figure 4 shows the general arrangement preferably adopted for the modulator and comprising a four pole generator with a wave winding on the rotor and consequently with only two brushes B and B'. The stator has four poles A, A', C, C' connected by pairs through a magnetic yoke proportional to the flux of said poles. In Figure 4 the paired poles are, on one side, the poles A and A' and, on the other side, the poles C and C'; each pole pair constitutes together with its magnetic yoke a magnetic circuit practically independent from the other. Each of said two distinct magnetic circuits generates a flux varying with the variation of the electric value chosen as an independent variable according to a law which is generally different for each of said fluxes. An electromotive force is thus induced across the brushes B and B', which is the algebraic sum of the electromotive forces induced by each of said fluxes, this resulting in a voltage which is a function of the electric value chosen as an independent variable, and is of a form which is often complex and very useful. Thus, starting from the diagram of Figure 3, in which the value chosen as an independent variable is the current of the direct current network, the inductors A, A' and B, B' of Figure 4 are provided with four windings, a winding with constant ampere turns (thin wire) and a winding with ampere turns proportional to the intensity of the direct current network (thick wire). These windings are wound in the same sense relative to inductors A and A' and are opposite for the inductors C and C'; they are mutually dimensioned in such manner that the voltage induced between the brushes by the flux of A and A' alone is shown by the curve $a, b, c$, in Figure 5, while the voltage induced by the flux of C, C' alone is shown by the curve, $d, e, f$. The total voltage set up between the brushes B, B' shall then be as shown by the curve $ghi$, of which the ordinates are the algebraic sum of the ordinates of the two preceding curves. The characteristic $ghi$ set up by the modulator 19 in Fig. 3 shall be faithfully followed by the voltage supplied by the converter as a function of the current supplied to the network. This characteristic is of a useful shape for compounding the mercury rectifiers and the converter is thereby rendered exempt from short circuits on the direct current network for, when the current I exceeds a predetermined value, the voltage supplied rapidly sinks.

Figure 6:
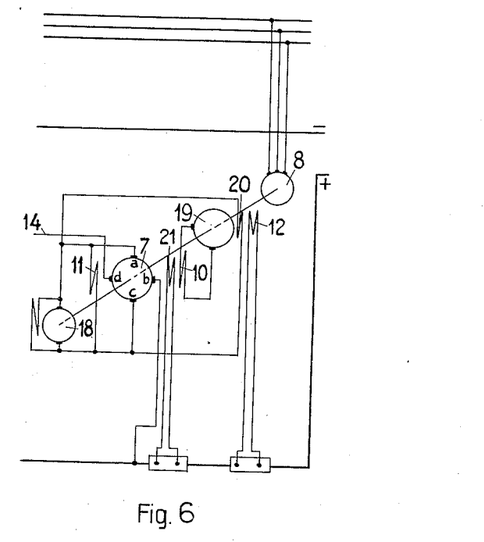
Figure 6 shows a modification of the connections of the control metadyne concerning the regulation of the direct current supplied by the converter.

In Figures 1, 2, and 3 the control metadyne regulates the voltage supplied by the converter, but may be arranged to regulate the current; for this purpose, it will be sufficient to arrange for a current proportional to that supplied by the converter to flow through the second element of the secondary variator of the control metadyne, as shown in Fig. 6, which differs from Figure 3 merely in that the winding 21 connected to the terminals of a shunt fed with the current supplied by the converter is substituted for the winding 9 of Figure 3 which is connected across the bars of the continuous current network.

Figure 9:
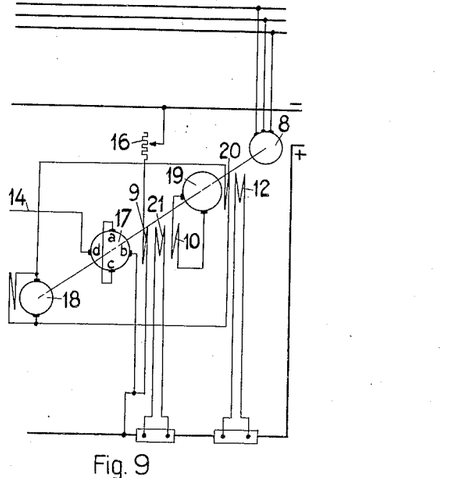
Figure 9 is a modification concerning the simultaneous regulation of the direct voltage and current supplied by the converter.

It is generally possible to regulate any linear function of the voltage V and current I supplied by the converter in the form $MV+NI$ according to the diagram of Figure 9, in which the control metadyne 17 is provided with a secondary variator, the element 10 whereof is fed from the modulator 19; the element 9 is shunted on the bars of the direct current network and the element 21 is connected to the terminals of a shunt placed in the direct current network.

With the various methods of regulation set forth above it is possible to obtain from the modulator characteristics suiting any desired requirement.

Figure 7:
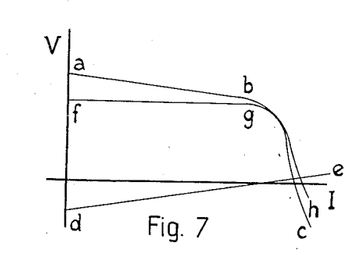

By way of example, the current I from the direct current network has been chosen as an independent variable for the characteristic of Figure 7; the desired characteristic being the one denoted by *fgh* of substantially constant voltage up to a certain value of I whence it rapidly falls down to O. This characteristic is of great interest and has been obtained by combining the characteristic *abc*, supplied for instance by the pole shoes A, A' and the characteristic *de* supplied to the pole shoes C, C'.

Figure 8:
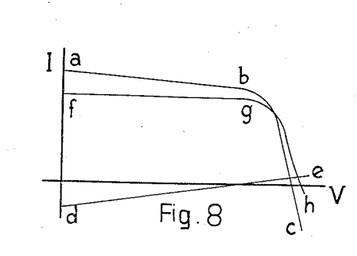

Similarly, it will be possible to obtain the characteristic *fgh* of Figure 8 which supplies a current substantially constant up to a certain value of V and then abruptly decreases. The characteristic *abc* and *de* are in this case the component characteristics.

In the above described connections the control metadyne regulates electrical values pertaining to the direct current network. It is, however, possible to regulate electric values pertaining to the alternating current network; for this purpose, it will be sufficient to rectify the alternating value and successively cause it to pass through an element of the secondary variator of the control metadyne.

Figures 10, 12:
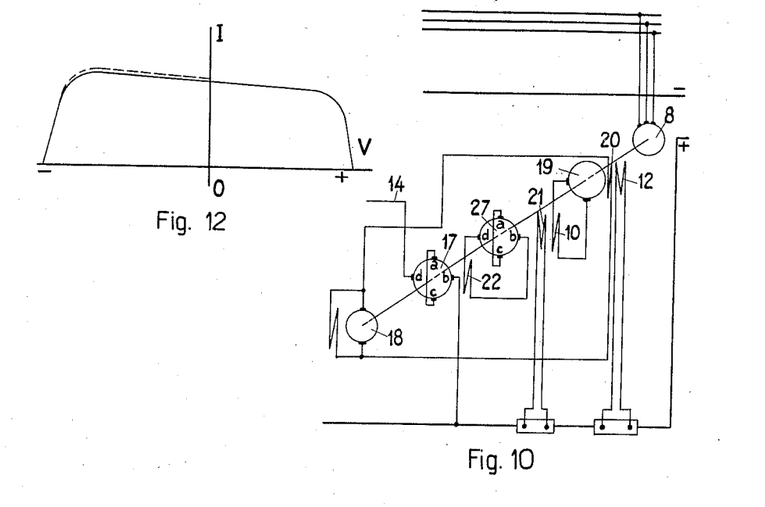
Figure 10 shows an arrangement which reduces considerably the difference between the desired characteristic and the characeristic actually obtained, said difference being necessary for timing the ignition of the anodes.
Figures 12 and 13 show the relative diagrams.

It has been said above that the accuracy with which the current and voltage supplied by the converter follows the desired characteristic increases with the increase in variation of the primary current of the control metadyne for a given difference in the ampere turns of the secondary variator. Figure 10 shows a method of improving this accuracy; the control metadyne 27, instead of having its brushes connected to the neutral point of the induction regulator and the cathode, respectively, has them connected to the terminals of the secondary variator 22 of a second metadyne 17, which has one of its secondary brushes, namely the brush *d*, connected to the neutral point of the star of the induction regulator and its other auxiliary brush, namely the brush *b*, connected to the cathode. The two metadynes 17 and 27 are thus connected in cascade and one acts as amplifier with respect to the other.

When a certain number of converters operate in parallel with a pilot generator of any kind (rotating machine or even converter) it is possible to apply any of the above described diagrams, eliminating the modulator and feeding the element of the variator (which in the previously described examples was fed from the modulator) with a current proportional both to the current and voltage of the pilot generator.

Figures 11, 13:
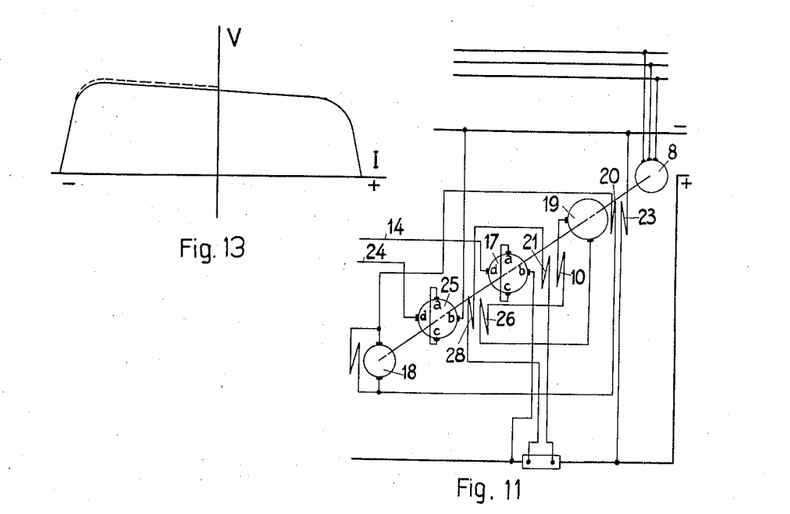
Figure 11 shows the connections of the control metadyne in combination with two converters, one of which operates as rectifier and the other as undulator.

It is often useful in a number of constructions, for instance in electric traction, to provide converters working as rectifiers, supplying electric energy to the continuous current network and as undulators supplying electric energy to the alternating current network. This service is easily afforded by the control metadyne which allows of a satisfactory change from the operation as rectifier to the operation as undulator and vice versa. For this purpose, I employ the wiring diagram shown in Fig. 11 including two control metadynes 17 and 25 the former of which acts on the rectifier, the lead 14 being connected to the neutral point of the star of the induction regulator of the rectifier, while the latter acts on the undulator, the lead 24 being connected to the neutral point of the star of the induction regulator of the undulator. The modulator 19 feeds the element 16 of the metadyne 17 and at the same time the element 26 of the metadyne 25. The two control metadynes regulate in this case the current supplied by the converters. To effect the gradual change from the working as rectifier to the working as undulator and vice versa, the characteristic produced by the modulator 19 is of the form indicated in full lines in Figure 12 where the current I decreases slightly as the voltage V rises from the negative to the positive values. In this manner, if $I_0$ is the ordinate corresponding to $V=0$, the undulator remains inoperative as long as I is smaller than $I_0$ and the rectifier is in operation, and vice versa as long as I is greater than $I_0$ and the rectifier remains inoperative, the undulator being operative. To make the differentiation even sharper, it is useful to regulate the ampere turns of the elements of the variators so as to slightly displace upwards the curve of the undulator operation, as shown by the dotted line in Figure 12. The characteristic falls rapidly as the voltage increases above a certain positive limit or sinks below a certain negative limit, in order to protect the rectifier against an excessive rise in intensity. Similarly a characteristic like the one shown in Figure 13 may be obtained for the networks of constant current intensity, by suitably modifying the connections of the windings, as will easily be understood. The method according to this invention is more particularly suitable for the actuation of a number of converters working either in parallel or in series.

Figure 14:
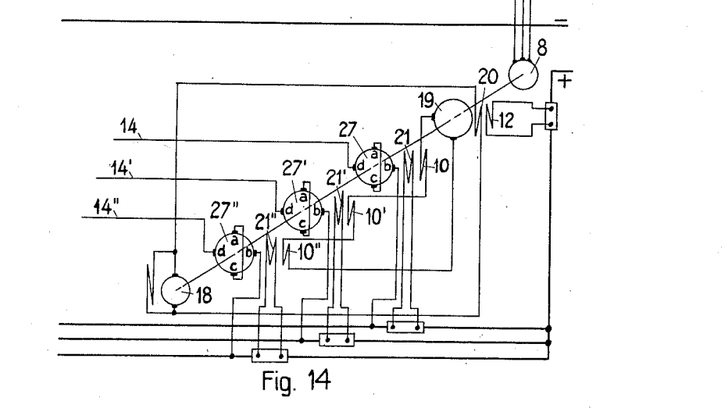
Figure 14 is a partial diagram showing the operation of three converters in parallel and Figure 15 is a diagram of the operation of two converters connected in series.

Figure 14 refers to the working in parallel of three converters. Three control metadynes are provided 27, 27', 27'', one for each converter; one modulator 19 feeds the elements 10, 10', 10'' of the metadynes 27, 27', 27'', respectively. In the diagram shown in Fig. 14, the elements 21, 21', 21'' are current coils. The field winding 12 of the modulator varies as a function of the total current, and might also vary as a function of the voltage of the direct current network. The method of energizing depends upon the type of the desired characteristic and upon reading this specification those skilled in the art may make the necessary connections without any inventive effort. The wiring diagram according to Figure 14 allows for an equal distribution of the current among the three converters as well as for establishing any desired constant ratio between the three currents in parallel: said ratio may be other than the unity and greater or smaller at will; for this purpose it will be sufficient to regulate the ampere turns of the elements of the variators of the control metadynes, this affords a simple means of connecting in parallel converters of very different capacities.

Figure 15:
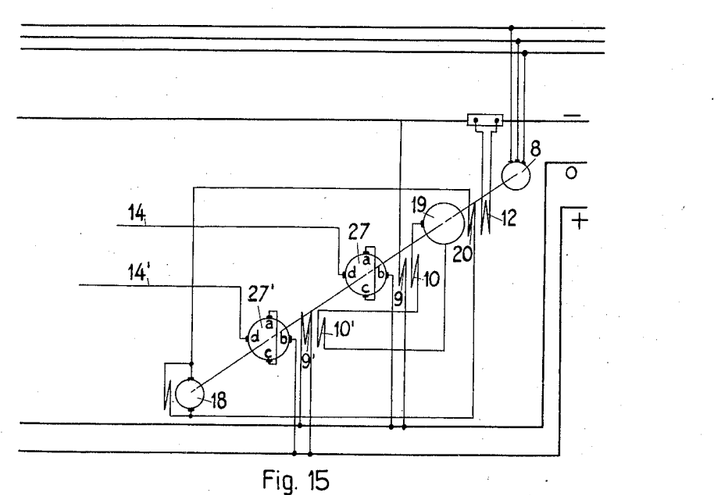

Figure 15 refers to the working in series of two converters for a three wire-distribution on the direct current network. Two control metadynes 27 and 27' are provided; the elements 9 and 9' are in this case voltage coils. The elements 10 and 10' are fed by the same modulator 19. It is obvious that the modulator 19 may be replaced by any other machine supplying a typical characteristic.

For simplicity's sake the satisfactory working of the converter has been supposed above to be ensured by applying to the grid an undulated potential resulting from the superposition of a sinusoidal value to a fixed value.

In operating some types of high-power converters under these conditions difficulties may arise and back-arc is often experienced. Two arrangements shall now be described which practically obviate this drawback, said arrangements being applicable either alone or combined. The first arrangement consists in replacing the grid voltage, constituted by a sinusoidal value superposed to a fixed value, by a voltage constituted by sharp isolated peaks superposed to a fixed value. The arrangement is known per se; this invention consists in providing a device which suitably distributes in time the voltage peaks to give to the converter the desired characteristic.

Figure 16:
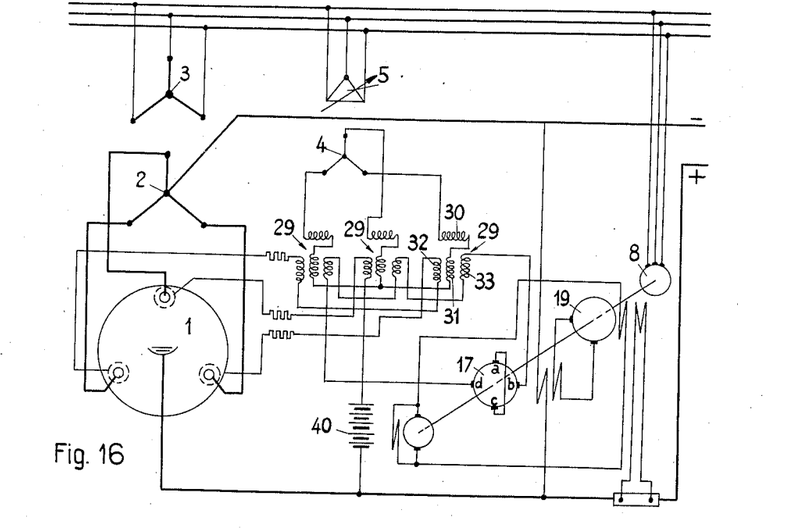
Figures 16, 17, 18, 19 and 20 show detail improvements.

Figure 16 shows this method; the secondary brushes $b$ and $d$ of the control metadyne 17 are no longer connected to the neutral point of the secondary star of the induction regulator and the cathode, respectively, and they now feed the tertiary windings 33 of the transformers 29, 29, 29.

Figure 17:
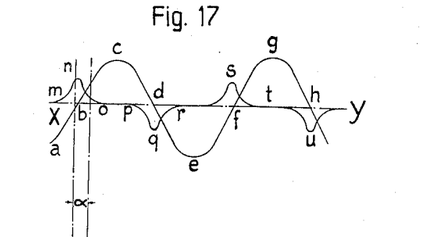

Figure 16 shows a converter of the three phase type exclusively in order to simplify the drawing. The transformer 29 is of known type and comprises a primary winding 31 surrounding a highly saturated magnetic circuit, a secondary winding 32 which is connected at one end to one of the grids and at its other end to an auxiliary source of current 40 for polarizing the grids and a tertiary circuit 33 for the secondary current of the control metadyne. A winding 30 is connected in series with the primary winding 31 and surrounds a non-saturated magnetic circuit. The whole of the primary circuits of said transformers constitutes a polyphase system fed by the secondary winding 4 of the induction regulator. The operation of this apparatus is known, but will be now briefly summarized with reference to the diagram shown in Fig. 17. Supposing $abcdefgh$ to denote the current flowing through the winding 30 and winding 31 and no current to flow at first through the tertiary winding 33, then the electromotive force set up in the secondary winding 32, being proportional to the variation of the flux in the saturated magnetic circuit shall have the shape $mnopqrstu$, with peaks at $nqsr$, exactly where the current flowing through the primary winding goes through zero. In fact, in this proximity the magnetic circuit is not saturated and the flux undergoes a strong variation. The winding 30 surrounding a non-saturated magnetic circuit maintains the primary current of substantially sinusoidal form and sets up almost the whole counter electromotive force during all the time in which the magnetic circuit surrounded by the primary winding 31 is saturated.

Supposing now the secondary brushes of the metadyne supply a definite current, the ampere turns whereof are shown in the diagram in Fig. 18 by the inverted values of the ordinates with respect to the straight lines $X'$ and $Y'$, the flux of the saturated magnetic circuit no longer passes through zero at the same time as the alternating current $ab'cd'ef'gh'$, but a little later for the ascending portion of the sinusoid, that is at the points $b'$ and $f'$, and a little sooner for the descending portion of the sinusoid, that is at the points $d'$ and $h'$. This gives the electric phase displacement between Figures 17 and 18 as clearly indicated.

In this manner the value and sense of the secondary current of the control metadyne permit for a timed displacement of the peaks $uqsv$ at the points $u'q's'v'$.

Figure 19:
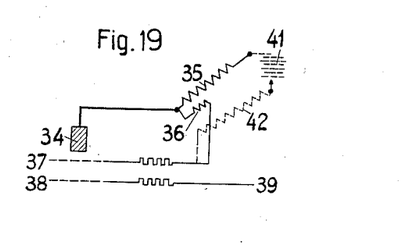

The second arrangement referred to above essentially consists in providing each anode 34 with two grids, as diagrammatically indicated in Fig. 19; a control grid 38 which is connected to the control grid, not shown in the drawings, through the lead 39 and a protecting grid 37 brought to a slightly lower potential as absolute value than the anode 34. This can be obtained for instance by means of a few turns 36 wound about the core of the main transformer in a direction opposite that of the turns of main secondary winding 35.

Figures 18, 20:
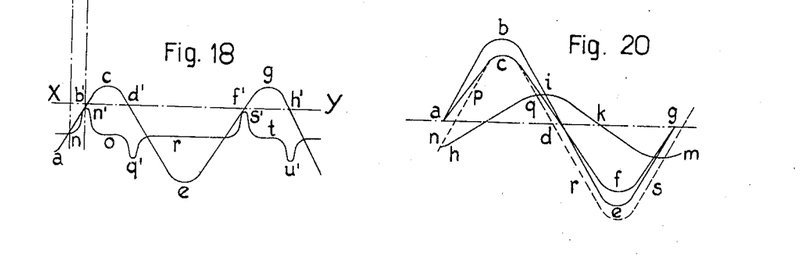

The operation will be better understood from the diagram shown in Figure 20, wherein $abdeg$ is supposed to denote the anodic voltage and $hikm$ the control grid voltage. Assuming no protecting grid is provided, during all the time in which the control grid is in proximity of $i$ and is more positive than the anode, there obviously is the danger of back-arc occurrence.

Supposing now a protecting grid is provided, the potential thereof shall be denoted by $acdfg$, consequently in proximity of $i$ with the control grid more positive than the anode, the protecting grid shall be more negative than the anode and will prevent back-arc. During the half-period following the point $d$, the protecting grid shall be more positive than the anode, but the arc is then already extinguished and there is no more danger of a back-arc.

When it is desired to obtain a still more accentuated effect of the protecting grid, the potential indicated by the dotted line $upqrs$ is applied thereto, whereby the grid becomes still more negative than the anode; this is easily obtained by feeding the protecting grid by means of a star, the neutral point whereof is polarized by means of an auxiliary source of current with respect to the neutral point of the star feeding the anodes.

The dotted lines in Fig. 19 show this arrangement, limited to one phase only; 41 denotes the auxiliary polarizing source and 42 one of the phases of the auxiliary star feeding the protecting grid.

I wish it to be understood that I do not desire to be limited to the exact details of construction shown and described, for obvious modifications will occur to a person skilled in the art.

What I claim is:

1. In an electric converter unit, the combination with an alternating current supply line, a direct current distribution line, a mercury vapour converter, a transformer of which the primary winding is connected to the alternating current line and the secondary star-shaped winding is connected to the anodes of said converter, of an induction regulator, of which the triangular primary winding is fed by the alternating current line and the star-shaped secondary winding is connected to the anodes of said converter, a control metadyne for the current of the converter unit, a variator for said control metadyne including a winding through which flows a variable current proportional to the current of the direct current network, a modulator generator feeding a further winding of said variator, a shunt generator feeding direct current at constant voltage to a field winding of said modulator generator, a field winding for said modulator generator fed by a variable current proportional to the current of the direct current network, an amplifying metadyne having its secondary brushes connected with the neutral point of the induction regulator and the direct current line, respectively, and a secondary variator winding for said amplifying metadyne connected to the secondary brushes of the control metadyne.

2. In an electric converter the combination with an alternating current supply line, a direct current distribution line, a mercury vapour converter, a transformer of which the primary winding is connected to the alternating current line and the secondary star-shaped winding is connected to the anodes of said converter, of an induction regulator, of which the triangular primary winding is fed by the alternating current line, a control metadyne, a three windings transformer for each phase of the star-shaped secondary winding of said regulator, of which the primary winding with saturated magnetic circuit is connected to the secondary winding of said regulator, the secondary winding is connected to a grid of said converter and to an auxiliary polarizing source for grids the tertiary winding of said tertiary transformer, being fed by the secondary brushes of the control metadyne, a variator for said control metadyne, a modulator generator feeding said variator, a shunt generator supplying direct current at constant voltage to a field winding of said modulator generator, a field winding for said modulator winding supplied with a current variable proportionally to the current of the direct current line and a motor fed by the alternating current line driving at constant speed said metadyne, modulator generator and shunt generator.

3. Electric converter unit, as claimed in claim 2, comprising a winding surrounding a non-saturated magnetic circuit connected in series with each primary winding of the tertary transformer.

4. In an electric converter unit, the combination with an alternating current supply line, a direct current distribution line, a mercury vapour converter, a transformer of which the primary winding is connected to the alternating current line and the secondary star-shaped winding is connected to the anodes of said converter, of an induction regulator, of which the triangular primary winding is fed by the alternating current line and the star-shaped secondary winding is connected to the anodes of said converter, a control metadyne for the current of the converter unit, a variator for said control metadyne including a winding through which flows a variable current proportional to the current of the direct current network, a modulator generator feeding a further winding of said variator, a shunt generator feeding direct current at constant voltage to a field winding of said modulator generator, a field winding for said modulator generator fed by a variable current proportional to the current of the direct current network and means for transforming the overcurrents traversing the secondary brushes of the metadyne into over voltages in the grids of the mercury arc rectifier.

JOSEPH MAXIMUS PESTARINI.